(12) United States Patent
Li

(10) Patent No.: US 9,986,331 B2
(45) Date of Patent: May 29, 2018

(54) METHOD AND APPARATUS FOR SELECTING MAIN MICROPHONE

(71) Applicant: ZTE CORPORATION, Shenzhen (CN)

(72) Inventor: Jiuxing Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days. days.

(21) Appl. No.: 15/323,224

(22) PCT Filed: Aug. 7, 2014

(86) PCT No.: PCT/CN2014/083857
§ 371 (c)(1),
(2) Date: Dec. 30, 2016

(87) PCT Pub. No.: WO2016/000292
PCT Pub. Date: Jan. 7, 2016

(65) Prior Publication Data
US 2017/0156005 A1    Jun. 1, 2017

(30) Foreign Application Priority Data

Jun. 30, 2014  (CN) .......................... 2014 1 0309043

(51) Int. Cl.
*H04R 3/00* (2006.01)
*H04M 1/725* (2006.01)
*H04R 29/00* (2006.01)
*H04R 1/40* (2006.01)

(52) U.S. Cl.
CPC ........ *H04R 3/005* (2013.01); *H04M 1/72569* (2013.01); *H04R 1/406* (2013.01); *H04R 29/005* (2013.01); *H04R 2499/11* (2013.01)

(58) Field of Classification Search
CPC ...... H04R 3/005; H04R 1/406; H04R 29/005; H04R 2499/11; H04M 1/72569
USPC .... 381/58, 122, 317, 321, 56, 94.3; 455/470
See application file for complete search history.

(56) References Cited

U.S. PATENT DOCUMENTS

| 8,102,995 B2 | 1/2012 | Kim | |
| 2009/0190769 A1* | 7/2009 | Wang | ....................... H03G 3/32 381/66 |
| 2009/0196429 A1* | 8/2009 | Ramakrishnan | ....... H04R 3/005 381/26 |

(Continued)

FOREIGN PATENT DOCUMENTS

| CN | 101043223 | 9/2007 |
| CN | 101552823 | 10/2009 |

(Continued)

OTHER PUBLICATIONS

Extended European Search Report for European Application No. 14896452.1, Completed by the European Patent Office, dated May 24, 2017, 8 Pages.

(Continued)

*Primary Examiner* — Melur Ramakrishnaiah
(74) *Attorney, Agent, or Firm* — Plumsea Law Group, LLC

(57) ABSTRACT

A terminal monitors a working state parameter of a main microphone arranged on the terminal; judges whether the working state parameter satisfies a preset rule; and prompts a user that an audio input signal is abnormal or selects a main microphone satisfying the preset rule as an audio input according to a judgment result.

15 Claims, 5 Drawing Sheets

(56) References Cited

U.S. PATENT DOCUMENTS

2010/0080084 A1 4/2010 Chen et al.
2014/0056439 A1 2/2014 Kim

FOREIGN PATENT DOCUMENTS

| CN | 203522835 | 4/2014 |
| WO | 2009097407 | 8/2009 |
| WO | 2014037766 | 3/2014 |

OTHER PUBLICATIONS

International Search Report for PCT/CN2014/083857, English Translation attached to original, Both completed by the Chinese Patent Office dated Mar. 10, 2015, All together 5 Pages.

* cited by examiner

METHOD AND APPARATUS FOR SELECTING MAIN MICROPHONE

CROSS-REFERENCE TO RELATED APPLICATIONS

This application is the U.S. national phase of PCT Application No. PCT/CN2014/083857 filed on Aug. 7, 2014, which claims priority to Chinese Patent Application No. 201410309043.8 filed on Jun. 30, 2014, the disclosures of which are incorporated in their entirety by reference herein.

TECHNICAL FIELD

The present document relates to audio processing techniques, and in particular, to a method and apparatus for selecting a main microphone.

BACKGROUND

At present, mobile terminals, such as mobile phones, have a number of microphones arranged thereon, including a single main microphone and multiple auxiliary microphones. The main microphone is primarily used to input a corresponding audio signal; and the auxiliary microphones are primarily used as noise-canceling microphones, earphone microphones, etc. Input methods for such single main microphone have the following defects: when a user is on a phone with a handset, once the main microphone is blocked by a human face or a finger, etc. or a direction and distance from the main microphone to a human mouth are not appropriate, the other party of the call cannot clearly hear the content of the call, and sometimes even cannot hear any sound. For example, if an input hole of the main microphone is arranged on the front of a display screen of a mobile phone, it is easy to be blocked by a face of a user who is accustomed to sticking the mobile phone to the human face; and if the input hole of the microphone is arranged on the left lower side or the right lower side of the mobile phone, it is easy to be blocked by a finger of the user who is accustomed to operating with a hand.

In order to overcome this drawback, the current solution is to arrange the input hole of the main microphone in a position where it is not easy to be blocked as much as possible for operation habits and handhold gestures of users in different countries and regions. However, the method of changing a position where the main microphone is arranged to overcome the defect that the main microphone is easy to be blocked by the user during use cannot fundamentally solve the problem of poor call quality, let alone meeting operation habits and handgrip gestures of different users.

SUMMARY

In view of the above content, it is necessary to provide a method and apparatus for selecting a main microphone, which aims at achieving the purpose of improving call quality by selecting at least two main microphones.

In order to achieve the above purpose, an embodiment of the present document provides a method for selecting a main microphone, including steps of:

monitoring a working state parameter of the main microphone arranged on a terminal;

judging whether the working state parameter satisfies a preset rule; and prompting a user that an audio input signal is abnormal or selecting a main microphone satisfying the preset rule as an audio input according to a judgment result.

Alternatively, the working state parameter includes audio input signal strength; and judging whether the working state parameter satisfies a preset rule includes judging whether the audio input signal strength is less than a preset sound intensity value.

Alternatively, the audio input signal strength is an average value of audio input signal strength within a preset time length.

Alternatively, monitoring a working state parameter of the main microphone arranged on a terminal includes: presetting a first main microphone in at least two main microphones arranged on the terminal as the audio input, and monitoring audio input signal strength of the first main microphone;

judging whether the working state parameter satisfies a preset rule includes: judging whether the audio input signal strength of the first main microphone is less than a preset sound intensity value; and prompting a user that an audio input signal is abnormal or selecting a main microphone satisfying the preset rule as an audio input according to a judgment result includes: if the audio input signal strength of the first main microphone is less than the preset sound intensity value, prompting the user that the audio input signal is abnormal; and if the audio input signal strength of the first main microphone is greater than or equal to the preset sound intensity value, using the first preset microphone as an audio input.

Alternatively, monitoring a working state parameter of the main microphone arranged on a terminal includes: monitoring audio input signal strength of at least two main microphones arranged on the terminal;

judging whether the working state parameter satisfies a preset rule includes: calculating the audio input signal strength of the at least two main microphones to acquire a first main microphone with maximum audio input signal strength; and judging whether audio input signal strength of the first main microphone is less than a preset sound intensity value; and prompting a user that an audio input signal is abnormal or selecting a main microphone satisfying the preset rule as an audio input according to a judgment result includes: if the audio input signal strength of the first main microphone is less than the preset sound intensity value, prompting the user that the audio input signal is abnormal; and if the audio input signal strength of the first main microphone is greater than or equal to the preset sound intensity value, using the first main microphone as an audio input.

Alternatively, judging whether the working state parameter satisfies a preset rule includes:

controlling at least two main microphones to alternately input an audio signal for a first preset time length and receiving the audio signals;

calculating various sound intensity average values corresponding to the audio signals which are alternatively inputted within a preset number of cycles by the at least two main microphones to acquire a maximum value among the sound intensity average values and a first main microphone corresponding to the maximum value; and judging whether at least one maximum value which is greater than or equal to a preset sound intensity value is acquired before the preset number of cycles reaches a set value;

wherein the set value is a ratio of an input time of normal input audio data of a main microphone to a product corresponding to main microphones; and the product corresponding to main microphones is a product of a total number of the main microphones and the first preset time length.

Alternatively, after using the first main microphone as an audio input, the method further includes:

monitoring and collecting an audio signal inputted through the first main microphone according to a preset time interval;

calculating an average strength value corresponding to an audio signal inputted through the first main microphone within a second preset time length;

when it is judged that the average strength value is greater than or equal to a preset sound intensity value, continuing to use the first main microphone for inputting an audio; and when it is judged that the average strength value is less than the preset sound intensity value, returning to perform monitoring audio input signal strength of at least two main microphones arranged on the terminal.

Further, in order to achieve the above purpose, an embodiment of the present document further provides an apparatus for selecting a main microphone, including:

a monitoring module configured to monitor a working state parameter of the main microphone arranged on a terminal; and a processing module configured to judge whether the working state parameter satisfies a preset rule; and prompt a user that an audio input signal is abnormal or select a main microphone satisfying the preset rule as an audio input according to a judgment result.

Alternatively, the working state parameter includes audio input signal strength; and the processing module is configured to judge whether the audio input signal strength is less than a preset sound intensity value.

Alternatively, the audio input signal strength is an average value of audio input signal strength within a preset time length.

Alternatively, the monitoring module is configured to preset a first main microphone in at least two main microphones arranged on the terminal as the audio input, and monitor audio input signal strength of the first main microphone;

the processing module is configured to:

judge whether the audio input signal strength of the first main microphone is less than a preset sound intensity value; and if the audio input signal strength of the first main microphone is less than the preset sound intensity value, prompt the user that the audio input signal is abnormal; and if the audio input signal strength of the first main microphone is greater than or equal to the preset sound intensity value, use the preset main microphone as an audio input.

Alternatively, the monitoring module is configured to:

monitor audio input signal strength of at least two main microphones arranged on the terminal;

the processing module is configured to:

calculate the audio input signal strength of the at least two main microphones to acquire a first main microphone with the maximum audio input signal strength; and judge whether audio input signal strength of the first main microphone is less than a preset sound intensity value; and if the audio input signal strength of the first main microphone is less than the preset sound intensity value, prompt the user that the audio input signal is abnormal; and if the audio input signal strength of the first main microphone is greater than or equal to the preset sound intensity value, use the first main microphone as an audio input.

Alternatively, the processing module is configured to:

control at least two main microphones to alternately input an audio signal for a first preset time length and receive the audio signals;

calculate various sound intensity average values corresponding to the audio signals which are alternatively inputted within a preset number of cycles by the at least two main microphones to acquire a maximum value among the sound intensity average values and a first main microphone corresponding to the maximum value; and judge whether at least one maximum value which is greater than or equal to a preset sound intensity value is acquired before the preset number of cycles reaches a set value;

wherein the set value is a ratio of an input time of normal input audio data of a main microphone to a product corresponding to main microphones; the product corresponding to main microphones is a product of a total number of the main microphones and the first preset time length.

Alternatively, the monitoring module is configured to:

monitor and collect an audio signal inputted through the first main microphone according to a preset time interval;

the processing module is configured to:

calculate an average strength value corresponding to an audio signal inputted through the first main microphone within a second preset time length;

when it is judged that the average strength value is greater than or equal to a preset sound intensity value, continue to use the first main microphone for inputting an audio; and when it is judged that the average strength value is less than the preset sound intensity value, return to perform, by the monitoring module, the operation of monitoring audio input signal strength of at least two main microphones arranged on the terminal.

An embodiment of the present document further provides a computer program including program instructions which, when executed by a terminal, cause the terminal to perform the method described above.

An embodiment of the present document further provides a carrier carrying the computer program described above.

The embodiments of the present document can automatically select the optimal main microphone from at least two main microphones arranged on the terminal to improve the quality of the audio input so as to completely avoid the problem of poor call quality resulting from blocking or clogging of the input hole of the main microphone due to users' operation habits, and improve the call quality.

The implementations of the purposes, the functional features and the advantages of the embodiments of the present document will be further described with reference to accompanying drawings.

PREFERRED EMBODIMENTS

Specific implementations of the present document will be described in detail below in combination with accompanying drawings. It should be illustrated that, embodiments in the present application and features in the embodiments can be combined with each other randomly without conflict.

Figure 1:
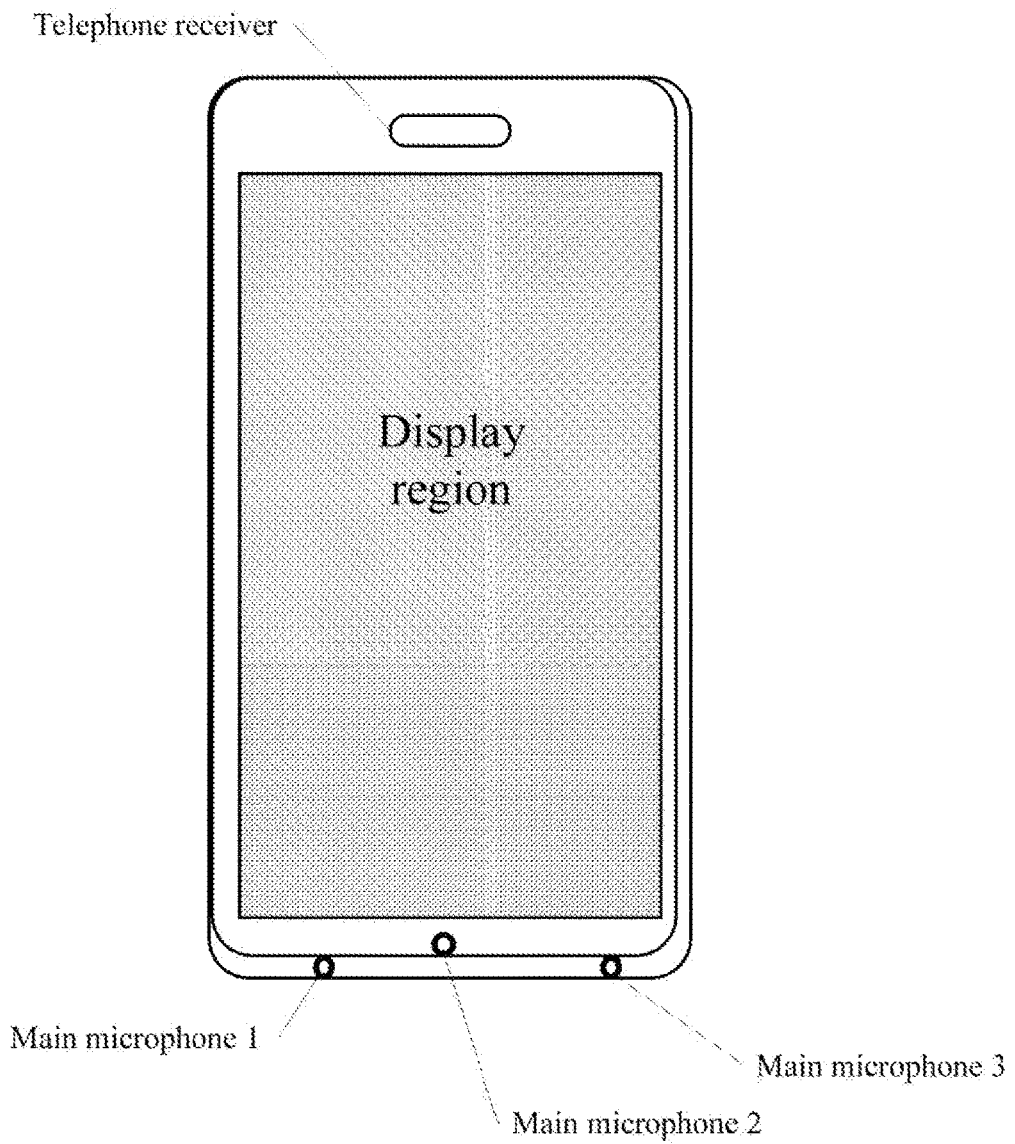
FIG. 1 is a diagram of various microphones on a mobile terminal provided with a plurality of main microphones according to an embodiment of present document.

The terminal involved in the method and apparatus for selecting a main microphone according to the embodiments of the present document has two or more main microphones arranged thereon, and the terminal can automatically select an optimal main microphone therefrom as an input for inputting a corresponding audio signal. With reference to FIG. 1, what is illustrated is a diagram of a distribution of various microphones on a mobile terminal provided with a plurality of main microphones according to an embodiment of the present document. The mobile terminal illustrated in FIG. 1 has three main microphones arranged thereon. The terminal involved in the method and apparatus for selecting a main microphone according to the embodiments of the present document primarily adopts a switch toggling mode to achieve automatic selection of an optimal main microphone for inputting an audio signal. Only one main microphone inputs a corresponding audio signal at a time. The terminal analyzes and compares audio signals of different main microphones, judges to acquire an optimal main microphone, and selects the optimal main microphone as the audio input by toggling the switch. In the audio input process, the terminal selects a corresponding different main microphone as the audio input using the switch toggling according to a specific situation, thus completely avoiding the problem of poor call quality resulting from blocking or clogging of the input hole of the main microphone due to users' operation habits.

Figure 2:
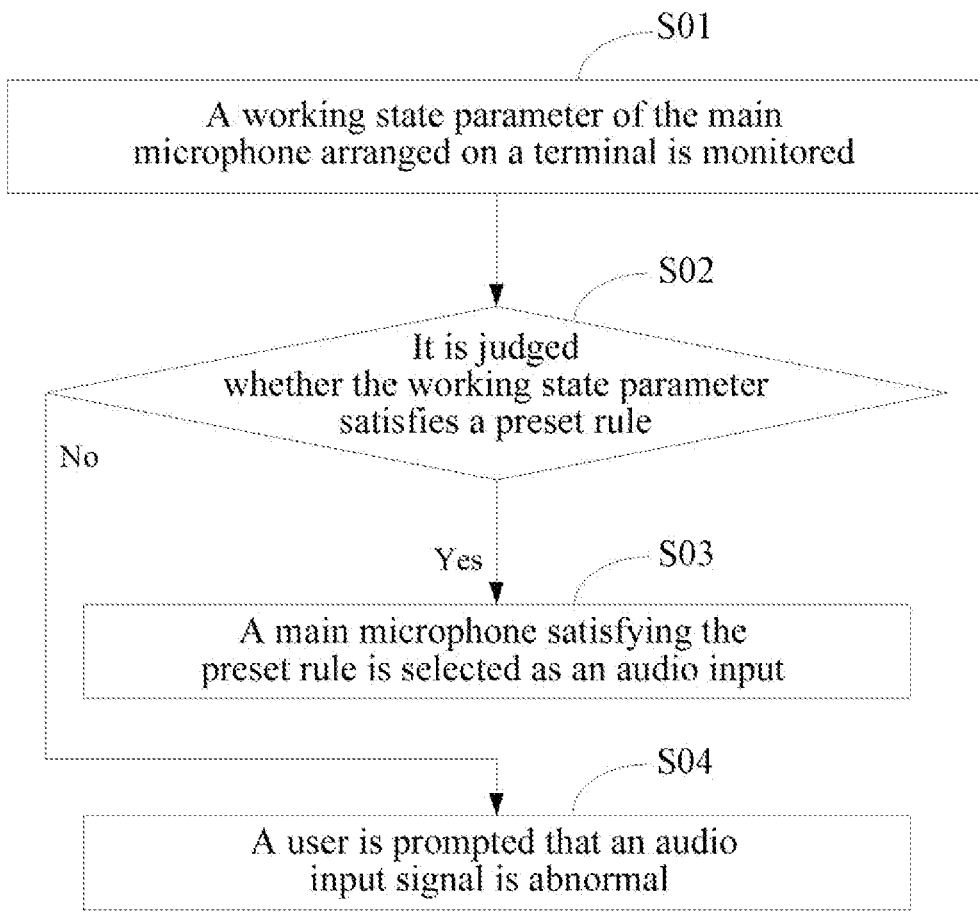
FIG. 2 is a flowchart of a first embodiment of a method for selecting a main microphone according to the present document.

An embodiment of the present document provides a first method embodiment for selecting a main microphone. As shown in FIG. 2, the method for selecting a main microphone according to the present document includes the following steps:

In step S01, a working state parameter of the main microphone arranged on a terminal is monitored.

In the embodiments of the present document, if an audio/video call function on the terminal is enabled, for example, a phone call on the terminal is connected or video/voice is put through, or an application on the terminal which uses a main microphone function is opened, for example, a recording function is started on the terminal, the terminal monitors the working state parameter of the main microphone arranged on the terminal.

In the embodiments of the present document, at least two main microphones are arranged on the terminal, and after an audio/video call on the terminal is enabled or an application on the terminal which uses a main microphone function is opened, the terminal monitors a working state parameter of each main microphone. Herein, the working state parameter includes audio input signal strength inputted using the main microphone. In order to improve the accuracy of the working state parameter of the main microphone monitored by the terminal, optionally, an average value of audio input signal strength of the microphone within a preset time length may be used as the audio input signal strength.

In step S02, it is judged whether the working state parameter satisfies a preset rule; if the working state parameter satisfies the preset rule, step S03 is performed; and if the working state parameter does not satisfy the preset rule, step S04 is performed.

In step S03, a main microphone satisfying the preset rule is selected as an audio input.

In step S04, a user is prompted that an audio input signal is abnormal.

The terminal judges whether the working state parameter of each main microphone satisfies the preset rule. In the embodiments of the present document, the preset rule includes: a default rule of the system and a user-defined rule, or rules which are customized by the technical personnel for various terminals when the terminals leave the factory, etc. The embodiments of the present document do not specifically limit the specific content of the above-described preset rules. For example, the terminal judges whether the audio input signal strength corresponding to each main microphone is less than a preset sound intensity value. In the embodiments of the present document, the preset sound intensity value can be understood as: the sound intensity inputted by using the main microphone is the lowest intensity value which can be recognized and processed by the terminal; or the sound intensity inputted by using the main microphone is the optimal intensity value which can be recognized and processed by the terminal. As types of various terminals are different and specific hardware configurations thereof are also different, the embodiments of the present document do not limit a specific value of the preset sound intensity value.

When the terminal judges that there is a working state parameter satisfying the preset rule among the working state parameters of the main microphones arranged on the terminal, the terminal selects a main microphone which satisfies the preset rule as an audio input. When the terminal judges that all the working state parameters of the main microphones arranged on the terminal are working state parameters which do not satisfy the preset rule, the terminal prompts the user that the audio input signal is abnormal. For example, the terminal transmits prompt information that the audio input is abnormal in a suitable manner, to prompt the user that there is currently no sound input or the sound input is abnormal.

In the embodiments of the present document, the terminal monitors a working state parameter of a main microphone arranged on a terminal; judges whether the working state parameter satisfies a preset rule; and prompts a user that an audio input signal is abnormal or selects a main microphone satisfying the preset rule as an audio input according to a judgment result. The embodiments of the present document have the beneficial effects of automatically selecting the optimal main microphone from at least two main microphones arranged on the terminal, which improves the quality of the audio input, thereby completely avoiding the problem of poor call quality resulting from blocking or clogging of the input hole of the main microphone due to users' operation habits, and further improving the call quality.

In the embodiments of the present document, for a terminal provided with a plurality of main microphones, when a call function on the terminal is started, for example, a phone call of the terminal is connected, or another application requiring to use a main microphone is opened, the terminal judges whether a function of selecting a main microphone is supported by itself. If the terminal does not support the function of selecting a main microphone, the terminal performs a corresponding operation according to a preset main microphone. Alternatively, when the terminal supports the function of selecting a main microphone, and a user selects a default main microphone of the system as an audio input, the terminal selects a main microphone in the manner as illustrated in FIG. 3.

Figure 3:
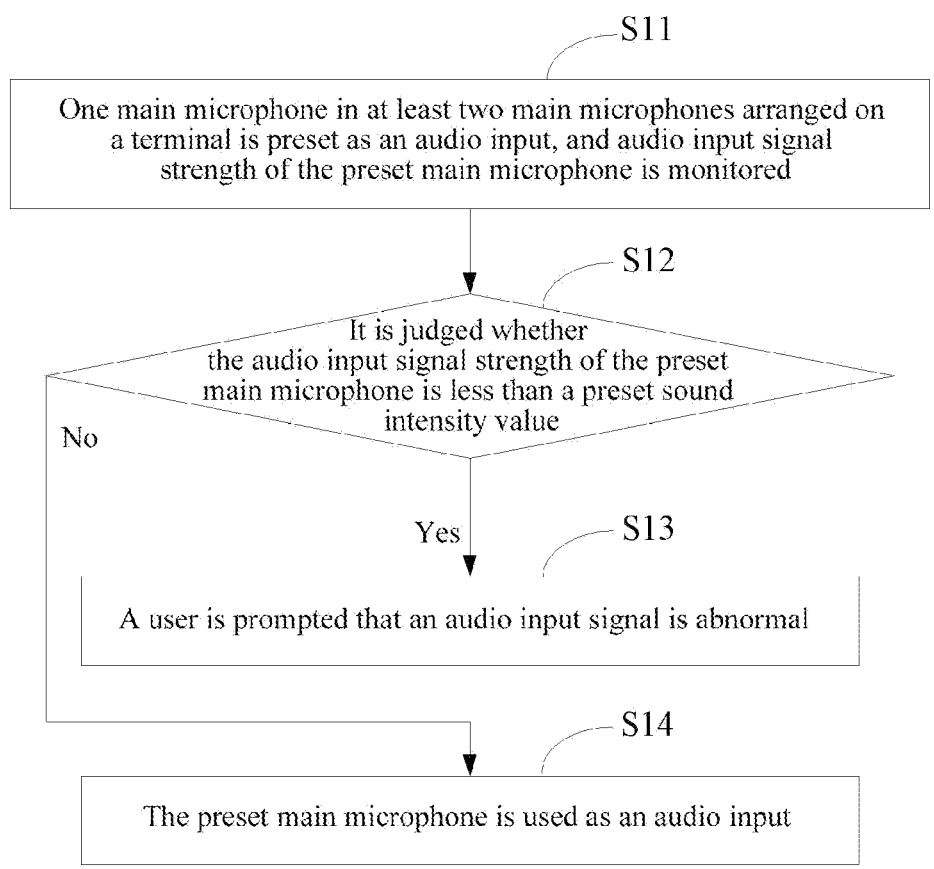
FIG. 3 is a flowchart of a second embodiment of a method for selecting a main microphone according to the present document.

With reference to FIG. 3, what is illustrated is a flowchart of a second embodiment of a method for selecting a main microphone according to the present document. As shown in FIG. 3, the method for selecting a main microphone includes the following steps.

In step S11, one main microphone in at least two main microphones arranged on a terminal is preset as an audio input, and audio input signal strength of the preset main microphone is monitored.

In the embodiments of the present document, one of at least two main microphones arranged on the terminal is preset by the terminal as the audio input by default. After an audio/video call on the terminal is enabled or an application on the terminal which uses a main microphone function is opened, the terminal monitors a working state parameter of the preset main microphone. Herein, the working state parameter includes audio input signal strength inputted using the preset main microphone. In order to improve the accuracy of the working state parameter of the preset main microphone monitored by the terminal, optionally, an average value of audio input signal strength of the preset microphone within a preset time length is used as the audio input signal strength.

In an alternative embodiment, the terminal prompts the user whether to select to use the default preset main microphone in the at least two main microphones arranged on the terminal as an input in a main microphone selection mode. If a selection of using the default preset main microphone as an input triggered by the user is received, the terminal inputs a corresponding audio signal using the default preset main microphone. Alternatively, if a call function on the terminal is started, for example, a telephone of the terminal is connected, or another application requiring to use the primary microphone is opened, the terminal judges whether a multi-microphone automatic switch function is supported by itself. If the terminal does not support the multi-selection main microphone function, the terminal performs a corresponding operation according to the preset main microphone i.

In step S12, it is judged whether the audio input signal strength of the preset main microphone is less than a preset sound intensity value; if the audio input signal strength of the preset main microphone is less than the preset sound intensity value, step S13 is performed; and if the audio input signal strength of the preset main microphone is greater than or equal to the preset sound intensity value, step S14 is performed.

In step S13, a user is prompted that an audio input signal is abnormal.

In step S14, the preset main microphone is used as an audio input.

When the terminal uses the default preset main microphone as the audio input, the terminal judges whether the audio input signal strength of the preset main microphone is less than the preset sound intensity value; if the audio input signal strength of the preset main microphone is less than the preset sound intensity value, the terminal prompts the user that, when the preset main microphone is used for inputting an audio, the audio input signal thereof is abnormal. For example, the terminal transmits prompt information that the audio input is abnormal in a suitable manner, so as to prompt the user that there is currently no sound input or the sound input is abnormal. If the audio input signal strength of the preset main microphone is greater than or equal to the preset sound intensity value, the terminal continues to use the preset main microphone as the audio input.

For example, the terminal monitors and collects an audio input signal of the default preset main microphone i once every a preset time length T2 and calculates corresponding audio input strength of the preset main microphone i within the input time length T0 to acquire a corresponding average sound intensity value V3. The terminal judges whether the average sound intensity value V3 within the preset time length T0 is less than the preset sound intensity value V0. If V3<V0, a module on the terminal corresponding to audio processing generates interruption, and thus the terminal transmits prompt information that the audio input is abnormal in a suitable manner, to prompt the user that there is currently no sound input or the sound input is abnormal. If V3≥V0, the terminal continues to use the main microphone i which is currently used for inputting as a normal main microphone for inputting.

If the terminal judges that the terminal itself supports a multi-selection main microphone function, the terminal uses a default main microphone k as the microphone for inputting in an automatic switch mode and prompts a user whether to use the current main microphone k as the microphone for inputting. If the terminal receives an operation instruction of selecting the default main microphone k as an input triggered by the user, the terminal inputs a corresponding audio signal using the default main microphone. Further, the terminal monitors and collects an audio input signal of the main microphone k once every a preset time length T2 and calculates corresponding audio input strength of the main microphone k within the input time length T0 to acquire a corresponding average sound intensity value V4. The terminal judges whether the average sound intensity value V4 within the preset time length T0 is less than the preset sound intensity value V0. If V4<V0, a module on the terminal corresponding to audio processing generates interruption, and thus the terminal transmits prompt information that the audio input is abnormal in a suitable manner, to prompt the user that there is currently no sound input or the sound input is abnormal. If V4≥V0, the terminal continues to use the main microphone i which is currently used for inputting as a normal main microphone for inputting.

In the example of the present document, the terminal presets one of at least two main microphones arranged on the terminal as the audio input, and monitors audio input signal strength of the preset main microphone; judges whether the audio input signal strength of the preset main microphone is less than a preset sound intensity value; if so, prompts the user that the audio input signal is abnormal; and if not, continues to use the preset main microphone as an audio input. This has beneficial effects of directly using the preset main microphone as the audio input, which omits the operation of selecting a main microphone for inputting an audio. The embodiment of the present document selects whether to use the default preset main microphone as an input according to the operation of the user, which improves the man-machine interaction.

In the embodiment of the method for selecting a main microphone according to the present document, for the terminal provided with multiple main microphones, when the terminal is in a main microphone selection mode and the user does select to use the default preset main microphone of the system as the audio input, the terminal automatically selects and switches to the optimal main microphone as a main microphone for inputting an audio signal by toggling a switch according to voice collection situations of various main microphones.

Figure 4:
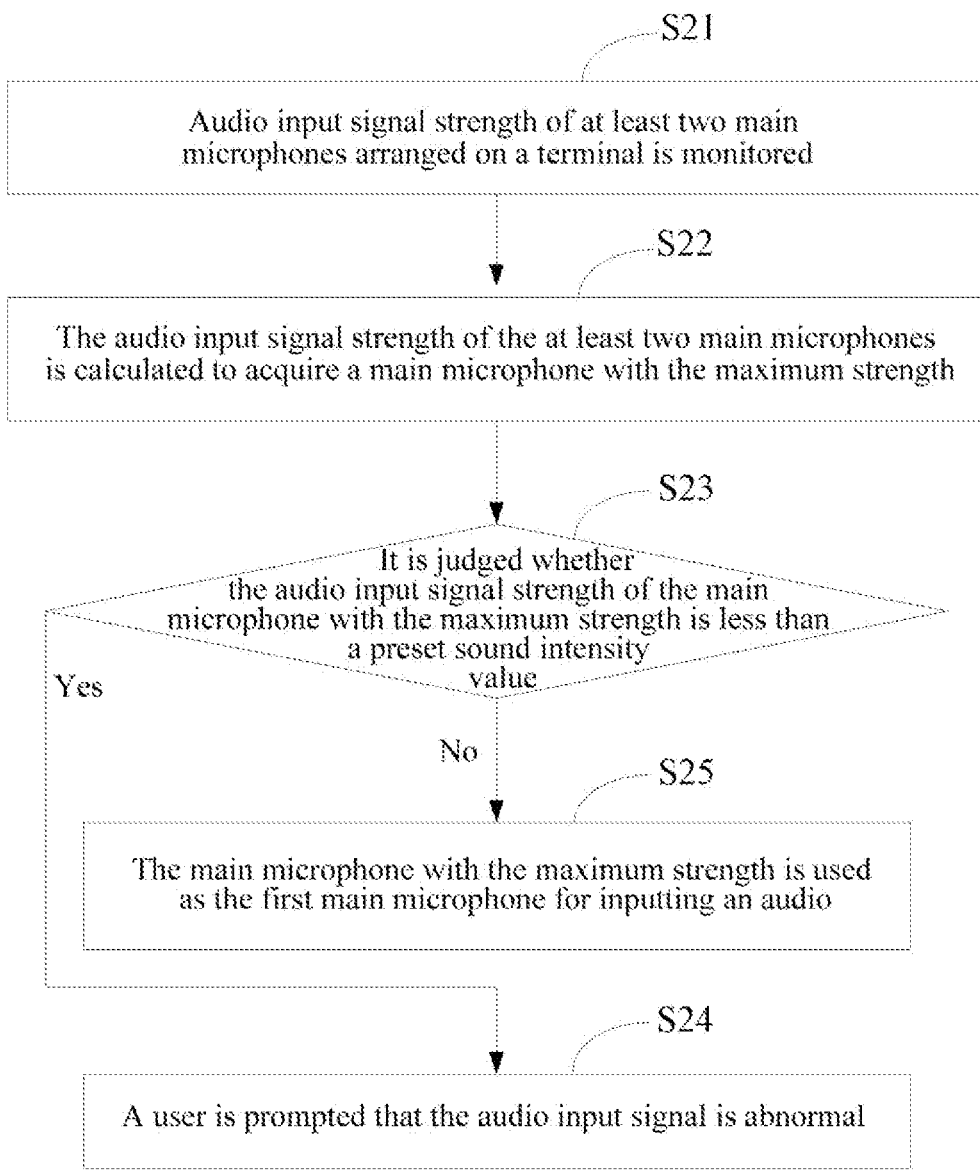
FIG. 4 is a flowchart of a third embodiment of a method for selecting a main microphone according to the present document.

With reference to FIG. 4, what is illustrated is a flowchart of a third embodiment of a method for selecting a main microphone according to present document. As shown in FIG. 4, the method for selecting a main microphone according to the present document includes the following steps.

In step S21, audio input signal strength of at least two main microphones arranged on a terminal is monitored.

In the embodiment of the present document, when the selection of the optimal main microphone is performed, the terminal controls various main microphones to input audio signals alternately, and at the same time, the terminal monitors audio input signal strength of the various main microphones. In a cycle in which all the main microphones arranged on the terminal alternately input audio signals, an input time for a single main microphone is a preset time length T1. The terminal receives the audio signals for the preset length T1 alternately inputted through the various main microphones. In the present embodiment, the audio signals received by the terminal include a processed audio signal, which for example removes a noise due to switch toggling, and the processed audio signal is propagated as a normal signal, so as not to affect normal audio input of the terminal during toggling.

In step S22, the audio input signal strength of the at least two main microphones is calculated to acquire a main microphone with the maximum strength.

The terminal calculates the audio input signal strength of the various main microphones to acquire a main microphone with the maximum strength. In an alternative embodiment, the terminal may calculate the audio input signal strength of the various the main microphones in the following manner.

The terminal calculates sound intensity average values corresponding to the audio signals alternately inputted through the various main microphones in a preset m cycles to acquire the maximum sound intensity average value V1 and a main microphone j corresponding to the maximum sound intensity average value V1.

After the terminal receives the audio signals alternately inputted through the various main microphones for a preset time length T1 in the m cycles, the terminal respectively calculates the sound intensity average values corresponding to the audio signals alternately inputted through the various main microphones in the above m cycles. The terminal finds the maximum sound intensity average value V1 from the acquired sound intensity average values corresponding to the various main microphones, and at the same time, finds a main microphone corresponding to the maximum sound intensity average value V1, and denotes the main microphone corresponding to the maximum sound intensity average value V1 as the main microphone j.

In step S23, it is judged whether the audio input signal strength of the main microphone with the maximum strength is less than a preset sound intensity value; if the audio input signal strength of the main microphone with the maximum strength is less than the preset sound intensity value, step S24 is performed; and if the audio input signal strength of the main microphone with the maximum strength is greater than or equal to the preset sound intensity value, step S25 is performed.

In step S24, a user is prompted that the audio input signal is abnormal.

In step S25, the main microphone with the maximum strength is used as the first main microphone for inputting an audio.

The terminal judges whether the acquired maximum sound intensity average value V1 is less than the preset sound intensity value. In the embodiments of the present document, the preset sound intensity value includes: a default sound intensity value of the system and a user-defined sound intensity value, or sound intensity values which are customized by the technical personnel for various terminals when the terminals leave the factory, etc. The embodiments of the present document do not specifically limit the specific values of the above-described preset sound intensity values. When the terminal judges that the maximum sound intensity average value V1 is greater than or equal to the preset sound intensity value, the terminal uses the main microphone j for inputting an audio; and when the terminal judges that the maximum sound intensity average value V1 is less than the preset sound intensity value, the terminal transmits prompt information that the audio input is abnormal in a suitable manner, to prompt the user that there is currently no sound input or the sound input is abnormal.

In an alternative embodiment of the present document, the terminal judging whether the maximum sound intensity average value V1 is less than the preset sound intensity value includes the following manners:

If before the number of cycles $m \geq T0/(N*T1)$, the terminal acquires at least one maximum sound intensity average value V1 greater than or equal to a preset sound intensity value V0, that is, before $m \geq T0/(N*T1)$, the terminal acquires at least one maximum sound intensity average value $V1 \geq V0$, then the terminal uses the main microphone j for inputting an audio, herein T0 is an input time T0 for a main microphones to normally input audio data, and N is the total number of the various main microphones arranged on the terminal.

If before the number of cycles $m \geq T0/(N*T1)$, all the maximum sound intensity average values V1 acquired by the terminal are less than the preset sound intensity value V0, then the terminal considers that the current audio input is abnormal, and a corresponding module on the terminal for audio processing generates interruption, and thus the terminal transmits prompt information that the audio input is abnormal in a suitable manner, to prompt the user that there is currently no sound input or the sound input is abnormal.

In the embodiment of the present document, if a current call of the terminal ends, for example, the telephone is hang up, or an application using the main microphone is closed, the terminal records a corresponding optimal main microphone k when it is closed, and uses the main microphone k as a default main microphone of the terminal in an automatic switch mode of the next time.

In the embodiment of the present document, in order to ensure the quality of the audio signal input, when the optimal main microphone j is used as the normal audio input, the terminal monitors the audio input of the main microphone j at a preset time interval so that when the input sound intensity of the main microphone j is poor, the microphone j is switched to another main microphone with the optimal sound intensity input.

When the terminal judges that the maximum sound intensity average value V1 is greater than or equal to the preset sound intensity value, after the main microphone j is used for inputting an audio, the terminal monitors and collects an audio signal inputted through the main microphone j at the preset time interval T2 and calculates sound intensity V2 corresponding to the audio signal inputted through the main microphone j within the preset time length T0; judges whether a relationship between the sound intensity V2 and the preset sound intensity value V0 satisfies $V2 \geq V0$; if V2≥V0, continues to use the main microphone j for inputting an audio; and if V2<V0, returns to perform step S21 to monitor audio input signal strength of at least two main microphones arranged on the terminal so that the terminal reselects the optimal main microphone.

In the embodiment of the present document, in order to avoid that the main microphone j acquired using the technical scheme of the embodiment described in FIG. 4 is not the optimal main microphone due to erroneous judgment by the terminal or a change in the usage environment of the terminal, after every interval of a time length T2, the terminal monitors and collects an audio signal inputted through the main microphone j, calculates sound intensity V2 corresponding to the audio signal inputted through the main microphone j within the preset time length T0; if V2≥V0, the terminal does not perform any main microphone switch operation, and continues to use the main microphone j as a normal main microphone for inputting; and if V2<V0, the terminal performs the technical scheme disclosed in the embodiment described in FIG. 4, to reselect an optimal main microphone.

In the embodiment of the present document, the terminal monitors audio input signal strength of at least two main microphones arranged on the terminal; calculates the audio input signal strength of the at least two main microphones to acquire a main microphone with the maximum strength; and judges whether audio input signal strength of the main microphone with the maximum strength is less than a preset sound intensity value; and if so, prompts the user that the audio input signal is abnormal; and if not, uses the main microphone with the maximum strength as a first main microphone for inputting an audio. Compared with the existing technology, the embodiment of the present document has the beneficial effects of automatically selecting the optimal main microphone by setting positions of separate main microphones on the terminal according to different operation habits of users in different countries and regions, which improves the quality of the audio input, thereby completely avoiding the problem of poor call quality resulting from blocking or clogging of the input hole of the main microphone due to users' operation habits, and improving the call quality. In addition, the embodiment of the present document monitors whether a selected main microphone is still the optimal main microphone at a preset time interval, which ensures that the optimal microphone is always used as an input when the terminal uses the main microphone, thereby ensuring the quality of the audio input of the terminal.

Figure 5:
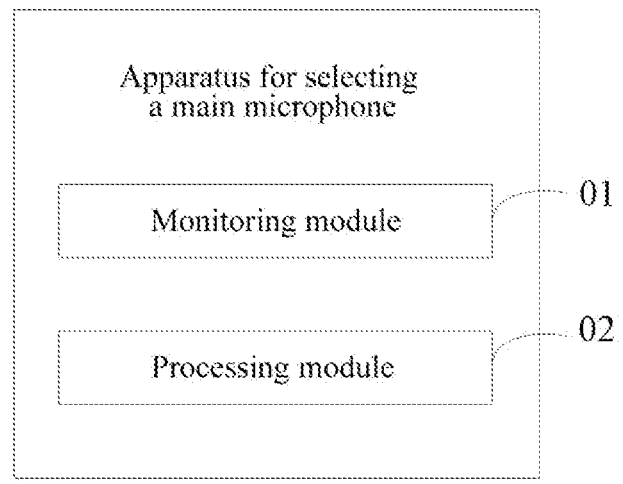
FIG. 5 is a functional block diagram of an embodiment of an apparatus for selecting a main microphone according to the present document.

The embodiment of the present document further provide an apparatus embodiment for selecting a main microphone. As shown in FIG. 5, the apparatus for selecting a main microphone according to the present document includes a monitoring module 01 and a processing module 02.

The monitoring module 01 is configured to monitor a working state parameter of the main microphone arranged on a terminal.

In the embodiments of the present document, if an audio/video call function on the terminal is enabled, for example, a phone on the terminal is turned on or video/voice is turned on, or an application on the terminal which uses a main microphone function is opened, for example, a recording function is started on the terminal, then the monitoring module 01 monitors the working state parameter of the main microphone arranged on the terminal.

In the embodiments of the present document, at least two main microphones are arranged on the terminal, and after an audio/video call on the terminal is enabled or an application on the terminal which uses a main microphone function is opened, the monitoring module 01 monitors a working state parameter of each main microphone. Herein, the working state parameter includes audio input signal strength inputted using the main microphone. In order to improve the accuracy of the working state parameter of the main microphone monitored by the monitoring module 01, optionally, an average value of audio input signal strength of the microphone within a preset time length is used by monitoring module 01 as the audio input signal strength.

The processing module 02 is configured to judge whether the working state parameter satisfies a preset rule; and prompt a user that an audio input signal is abnormal or select a main microphone satisfying the preset rule as an audio input according to a judgment result.

The processing module 02 judges whether the working state parameter of each main microphone satisfies the preset rule. In the embodiments of the present document, the preset rule includes a default rule of the system and a user-defined rule, or rules which are customized by the technical personnel for various terminals when the terminals leave the factory. The embodiments of the present document do not specifically limit the specific content of the above-described preset rules. For example, the processing module 02 judges whether the audio input signal strength corresponding to each main microphone is less than a preset sound intensity value. In the embodiments of the present document, the preset sound intensity value can be understood that sound intensity inputted using the main microphone is the lowest intensity value which can be recognized and processed by the terminal; or the sound intensity inputted using the main microphone is the optimal intensity value which can be recognized and processed by the terminal. As types of various terminals are different and specific hardware configurations thereof are also different, the embodiments of the present document do not limit a specific value of the preset sound intensity value.

When the processing module 02 judges that there is a working state parameter satisfying the preset rule among the working state parameters of the main microphones arranged on the terminal, the processing module 02 selects a main microphone which satisfies the preset rule as an audio input. When the processing module 02 judges that all the working state parameters of the main microphones arranged on the terminal are working state parameters which do not satisfy the preset rule, the processing module 02 prompts the user that the audio input signal is abnormal. For example, the processing module 02 transmits prompt information that the audio input is abnormal in a suitable manner, to prompt the user that there is currently no sound input or the sound input is abnormal.

In the embodiments of the present document, the terminal monitors a working state parameter of a main microphone arranged on a terminal; judges whether the working state parameter satisfies a preset rule; and prompts a user that an audio input signal is abnormal or selects a main microphone satisfying the preset rule as an audio input according to a judgment result. The embodiments of the present document have the beneficial effects of automatically selecting the optimal main microphone from at least two main microphones arranged on the terminal, which improves the quality of the audio input, thereby completely avoiding the problem of poor call quality resulting from blocking or clogging of the input hole of the main microphone due to users' operation habits, and further improving the call quality.

In the embodiments of the apparatus for selecting a main microphone according to the present document, for a terminal provided with a plurality of main microphones, when a call function on the terminal is started, for example, a phone call of the terminal is connected, or another application requiring to use a main microphone is opened, the terminal judges whether a function of selecting a main microphone is supported by itself. If the terminal does not support the function of selecting a main microphone, the terminal performs a corresponding operation according to a preset main microphone. Alternatively, when the terminal supports the function of selecting a main microphone, and a user selects a default main microphone of the system as an audio input, the terminal selects a main microphone in the manner described below.

With reference to FIG. 5, in the apparatus for selecting a main microphone according to the embodiment of the present document, the monitoring module 01 is further configured to preset a main microphone in at least two main microphones arranged on a terminal as an audio input, and monitor audio input signal strength of the preset main microphone.

In the embodiments of the present document, one of at least two main microphones are arranged on the terminal is preset by the terminal as the audio input by default. After an audio/video call on the terminal is enabled or an application on the terminal which uses a main microphone function is opened, the monitoring module 01 monitors a working state parameter of the preset main microphone. Herein, the working state parameter includes audio input signal strength inputted using the preset main microphone. In order to improve the accuracy of the working state parameter of the preset main microphone monitored by the terminal, optionally, an average value of audio input signal strength of the preset microphone within a preset time length is used as the audio input signal strength.

In an alternative embodiment, the monitoring module 01 prompts the user whether to select to use the default preset main microphone in the at least two main microphones arranged on the terminal as an input in a main microphone selection mode. If a selection of using the default preset main microphone as an input triggered by the user is received, the monitoring module 01 inputs a corresponding audio signal using the default preset main microphone. Alternatively, if a call function on the terminal is started, for example, a phone call of the terminal is connected, or another application requiring to use the main microphone is opened, the monitoring module 01 judges whether a multi-microphone automatic switch function is supported by itself. If the terminal does not support the multi-selection main microphone function, the monitoring module 01 performs a corresponding operation according to the preset main microphone i.

The processing module 02 is further used to:
judge whether the audio input signal strength of the preset main microphone is less than a preset sound intensity value; if the audio input signal strength of the preset main microphone is less than the preset sound intensity value, prompt a user that an audio input signal is abnormal; and if the audio input signal strength of the preset main microphone is greater than or equal to the preset sound intensity value, use the preset main microphone as an audio input.

When the monitoring module 01 uses the default preset main microphone as the audio input, the processing module 02 judges whether the audio input signal strength of the preset main microphone is less than the preset sound intensity value; if the audio input signal strength of the preset main microphone is less than the preset sound intensity value, the processing module 02 prompts the user that, when the preset main microphone is used for inputting an audio, the audio input signal thereof is abnormal. For example, the processing module 02 transmits prompt information that the audio input is abnormal in a suitable manner, so as to prompt the user that there is currently no sound input or the sound input is abnormal. If the audio input signal strength of the preset main microphone is greater than or equal to the preset sound intensity value, the processing module 02 continues to use the preset main microphone as the audio input.

For example, the monitoring module 01 monitors and collects an audio input signal of the default preset main microphone i once every a preset time length T2 and the processing module 02 calculates corresponding audio input strength of the preset main microphone i within the input time length T0 to acquire a corresponding average sound intensity value V3. The processing module 02 judges whether the average sound intensity value V3 within the preset time length T0 is less than the preset sound intensity value V0. If V3<V0, a module on the terminal corresponding to audio processing generates interruption, and thus the processing module 02 transmits prompt information that the audio input is abnormal in a suitable manner, to prompt the user that there is currently no sound input or the sound input is abnormal. If V3≥V0, the processing module 02 continues to use the main microphone i which is currently used for inputting as a normal main microphone for inputting.

If the monitoring module 01 judges that the terminal supports a multi-selection main microphone function, the monitoring module 01 uses a default main microphone k as the microphone for inputting in an automatic switch mode and prompts a user whether to use the current main microphone k as the microphone for inputting. If the monitoring module 01 receives a user-triggered operation instruction of selecting the default main microphone k as an input, the monitoring module 01 inputs a corresponding audio signal using the default main microphone. Further, the processing module 02 monitors and collects an audio input signal of the main microphone k once every a preset time length T2 and calculates corresponding audio input strength of the main microphone k in the input time length T0 to acquire a corresponding average sound intensity value V4. The processing module 02 judges whether the average sound intensity value V4 within the preset time length T0 is less than the preset sound intensity value V0. If V4<V0, a module on the terminal corresponding to audio processing generates interruption, and thus the processing module 02 transmits prompt information that the audio input is abnormal in a suitable manner, to prompt the user that there is currently no sound input or the sound input is abnormal. If V4≥V0, the processing module 02 continues to use the main microphone i which is currently used for inputting as a normal main microphone for inputting.

In the example of the present document, the terminal presets one of at least two main microphones arranged on the terminal as the audio input, and monitors audio input signal strength of the preset main microphone; judges whether the audio input signal strength of the preset main microphone is less than a preset sound intensity value; if so, prompts the user that the audio input signal is abnormal; and if not, continues to use the preset main microphone as an audio input. This has beneficial effects of directly using the preset main microphone as the audio input, which omits the operation of selecting a main microphone for inputting an audio. The embodiment of the present document selects whether to use the default preset main microphone as an input according to the operation of the user, which improves the man-machine interaction.

Also with reference to FIG. 5, in the embodiment of the apparatus for selecting a main microphone according to the present document, for the terminal provided with multiple main microphones, when the terminal is in a main microphone selection mode and the user does select to use the default preset main microphone of the system as the audio input, the terminal automatically selects and switches to the optimal main microphone as a main microphone for inputting an audio signal by toggling a switch according to voice collection situations of various main microphones.

Also with reference to FIG. 5, in the apparatus for selecting a main microphone according to the present document, as shown in FIG. 5, the monitoring module 01 is further configured to:

monitor audio input signal strength of at least two main microphones arranged on a terminal.

In the embodiment of the present document, when the selection of the optimal main microphone is performed, the terminal controls various main microphones to input audio signals alternately, and at the same time, the monitoring module 01 monitors audio input signal strength of the various main microphones. In a cycle in which all the main microphones arranged on the terminal alternately input audio signals, an input time for a single main microphone is a preset time length T1. The monitoring module 01 receives the audio signals for the preset length T1 alternately inputted through the various main microphones. In the present embodiment, the audio signals received by the monitoring module 01 include a processed audio signal, which for example removes a noise due to switch toggling, and the processed audio signal is propagated as a normal signal, so as not to affect normal audio input of the terminal during toggling.

The processing module 02 is further configured to:

calculate the audio input signal strength of the at least two main microphones to acquire a main microphone with the maximum strength; judge whether audio input signal strength of the main microphone with the maximum strength is less than a preset sound intensity value; if the audio input signal strength of the main microphone with the maximum strength is less than the preset sound intensity value, prompt a user that the audio input signal is abnormal; and if the audio input signal strength of the main microphone with the maximum strength is greater than or equal to the preset sound intensity value, use the main microphone with the maximum strength as the first main microphone for inputting an audio.

The processing module 02 calculates the audio input signal strength of the various main microphones to acquire a main microphone with the maximum strength. In an alternative embodiment, the processing module 02 may calculate the audio input signal strength of the various main microphones in the following manner.

The processing module 02 calculates sound intensity average values corresponding to the audio signals inputted alternately through the various main microphones in a preset m cycles to acquire the maximum sound intensity average value V1 and a main microphone j corresponding to the maximum sound intensity average value V1.

After the processing module 02 receives the audio signals inputted alternately through the various main microphones within a preset time length T1 in the m cycles, the processing module 02 respectively calculates the sound intensity average values corresponding to the audio signals alternately inputted through the various main microphones in the above-described m cycles. The processing module 02 finds the maximum sound intensity average value V1 from the acquired sound intensity average values corresponding to the various main microphones, and at the same time, finds a main microphone corresponding to the maximum sound intensity average value V1, and denotes the main microphone corresponding to the maximum sound intensity average value V1 as the main microphone j.

The processing module 02 judges whether the acquired maximum sound intensity average value V1 is less than the preset sound intensity value. In the embodiments of the present document, the preset sound intensity value includes: a default sound intensity value of the system and a user-defined sound intensity value, or sound intensity values which are customized by the technical personnel for various terminals when the terminals leave the factory, etc. The embodiments of the present document do not specifically limit the specific values of the above-described preset sound intensity values. When the processing module 02 judges that the maximum sound intensity average value V1 is greater than or equal to the preset sound intensity value, the processing module 02 uses the main microphone j for inputting an audio; and when the processing module 02 judges that the maximum sound intensity average value V1 is less than the preset sound intensity value, the processing module 02 transmits prompt information that the audio input is abnormal in a suitable manner, to prompt the user that there is currently no sound input or the sound input is abnormal.

In an alternative embodiment of the present document, the processing module 02 judging whether the maximum sound intensity average value V1 is less than the preset sound intensity value includes the following manners.

If before the number of cycles $m \geq T0/(N*T1)$, the processing module 02 acquires at least one maximum sound intensity average value V1 that is greater than or equal to a preset sound intensity value V0, that is, before $m \geq T0/(N*T1)$, the processing module 02 acquires at least one maximum sound intensity average value $V1 \geq V0$, the processing module 02 uses the main microphone j for inputting an audio, wherein T0 is an input time T0 for a main microphones to normally input audio data, and N is the total number of the various main microphones arranged on the terminal.

If before the number of cycles $m \geq T0/(N*T1)$, all the maximum sound intensity average values V1 acquired by the processing module 02 are less than the preset sound intensity value V0, the processing module 02 considers that the current audio input is abnormal, and a corresponding module on the terminal for audio processing generates interruption, and thus the processing module 02 transmits prompt information that the audio input is abnormal in a suitable manner, to prompt the user that there is currently no sound input or the sound input is abnormal.

In the embodiment of the present document, if a current call of the terminal ends, for example, the telephone is hang up, or an application using the main microphone is closed, the processing module 02 records a corresponding optimal main microphone k when it is closed, and uses the main microphone k as a default main microphone of the terminal in an automatic switch mode for the next time.

In the embodiment of the present document, in order to ensure the quality of the audio signal input, when the optimal main microphone j is used as the normal audio input, the processing module 02 monitors the audio input of the main microphone j at a preset time interval so that, when the input sound intensity of the main microphone j is poor, the microphone j is switched to another main microphone with the optimal sound intensity input.

When the processing module 02 judges that the maximum sound intensity average value V1 is greater than or equal to the preset sound intensity value, after the main microphone j is used for inputting an audio, the monitoring module 01 monitors and collects an audio signal of the main microphone j at the preset time interval T2 and processing module 02 calculates sound intensity V2 corresponding to the audio signal inputted through the main microphone j within the preset time length T0; judges whether a relationship between the sound intensity V2 and the preset sound intensity value V0 satisfies V2≥V0; if V2≥V0, the processing module 02 continues to use the main microphone j for inputting an audio; and if V2<V0, the monitoring module 01 continues to monitor audio input signal strength of at least two main microphones arranged on the terminal so that the processing module 02 reselects the optimal main microphone.

In the embodiment of the present document, in order to avoid that the acquired main microphone j is not the optimal main microphone due to erroneous judgment by the terminal or a change in the usage environment of the terminal, after every interval of a time length T2, the monitoring module 01 monitors and collects an audio signal inputted through the main microphone j, the processing module 02 calculates sound intensity V2 corresponding to the audio signal inputted through the main microphone j within the preset time length T0; if V2≥V0, the processing module 02 does not perform any main microphone switch operation, and continues to use the main microphone j as a normal main microphone for inputting; and if V2<V0, the processing module 02 reselects an optimal main microphone.

In the embodiment of the present document, the terminal monitors audio input signal strength of at least two main microphones arranged on the terminal; calculates the audio input signal strength of the at least two main microphones to acquire a main microphone with the maximum strength; and judges whether audio input signal strength of the main microphone with the maximum strength is less than a preset sound intensity value; and if so, prompts the user that the audio input signal is abnormal; and if not, uses the main microphone with the maximum strength as a first main microphone for inputting an audio. Compared with the existing technology, the embodiment of the present document has the beneficial effects of automatically selecting the optimal main microphone by setting positions of separate main microphones on the terminal according to different operation habits of users in different countries and regions, which improves the quality of the audio input, thereby completely avoiding the problem of poor call quality resulting from blocking or clogging of the input hole of the main microphone due to users' operation habits, and improving the call quality. In addition, the embodiment of the present document monitors whether a selected main microphone is still the optimal main microphone at a preset time interval, which ensures that the optimal microphone is always used as an input when the terminal uses the main microphone, thereby ensuring the quality of the audio input of the terminal.

It is to be illustrated that the terms "comprising" "including" or any other variations thereof herein are intended to encompass a non-exclusive inclusion, so that a process, method, article, or apparatus that includes a serial of elements includes not only those elements, but also includes other elements not expressly listed, or may also include elements inherent to such process, method, article, or apparatus. In the absence of further limitations, the elements defined by the phrase "including one of" do not preclude the presence of additional identical elements in the process, method, article, or apparatus that includes the elements.

Serial numbers of the embodiments of the present document described above are merely for purposes of illustration and are not intended to distinguish good embodiments from bad embodiments.

It will be apparent to those skilled in the art from the foregoing description of the implementations that the methods according to the above-described embodiments can be implemented via software plus the necessary general-purpose hardware platform, and of course can also be implemented by hardware, but in many cases, the former is a better implementation. Based on this understanding, the technical solutions of the present document can be embodied, in essence or as a contribution to the existing technology, in the form of a software product stored in a storage medium (such as ROM/RAM, a magnetic disk, an optical disc), which includes a number of instructions for causing a terminal device (which may be a mobile phone, a computer, a server, or a network device, etc.) to perform the methods described in the various embodiments of the present document.

The above description is merely preferred embodiments of the present document and is not intended to limit the patent scope thereof. Equivalent structures or equivalent flow transformations made with the contents of the present specification and drawings of the present document, which is directly or indirectly applied to other related technical art, are all similarly included within the patent protection scope of the present document.

INDUSTRIAL APPLICABILITY

The embodiments of the present document can automatically select the optimal main microphone from at least two main microphones arranged on the terminal to improve the quality of the audio input so as to completely avoid the problem of poor call quality resulting from blocking or clogging of the input hole of the main microphone due to users' operation habits, and improve the call quality.

What is claimed is:

1. A method for selecting a main microphone, comprising:
   monitoring a working state parameter of the main microphone arranged on a terminal;
   judging whether the working state parameter satisfies a preset rule; and
   prompting a user that an audio input signal is abnormal or selecting a main microphone satisfying the preset rule as an audio input according to a judgment result;
   wherein the working state parameter comprises audio input signal strength; and said judging whether the working state parameter satisfies a preset rule comprises judging whether the audio input signal strength is less than a preset sound intensity value.

2. The method according to claim 1, wherein the audio input signal strength is an average value of audio input signal strength within a preset time length.

3. The method according to claim 1, wherein said monitoring a working state parameter of the main microphone arranged on a terminal comprises: presetting a first main microphone in at least two main microphones arranged on the terminal as the audio input, and monitoring audio input signal strength of the first main microphone;
   said judging whether the working state parameter satisfies a preset rule comprises: judging whether the audio input signal strength of the first main microphone is less than a preset sound intensity value; and said prompting a user that an audio input signal is abnormal or selecting a main microphone satisfying the preset rule as an audio input according to a judgment result comprises: if the audio input signal strength of the first main microphone is less than the preset sound intensity value, prompting the user that the audio input signal is abnormal; and if the audio input signal strength of the first main microphone is greater than or equal to the preset sound intensity value, using the first main microphone as an audio input.

4. The method according to claim 1, wherein said monitoring a working state parameter of the main microphone arranged on a terminal comprises: monitoring audio input signal strength of at least two main microphones arranged on the terminal;

said judging whether the working state parameter satisfies a preset rule comprises: calculating the audio input signal strength of the at least two main microphones to acquire a first main microphone with maximum audio input signal strength; and judging whether audio input signal strength of the first main microphone is less than a preset sound intensity value; and said prompting a user that an audio input signal is abnormal or selecting a main microphone satisfying the preset rule as an audio input according to a judgment result comprises: if the audio input signal strength of the first main microphone is less than the preset sound intensity value, prompting the user that the audio input signal is abnormal; and if the audio input signal strength of the first main microphone is greater than or equal to the preset sound intensity value, using the first main microphone as an audio input.

5. The method according to claim 4, wherein said judging whether the working state parameter satisfies a preset rule comprises:

controlling at least two main microphones to alternately input an audio signal for a first preset time length and receiving the audio signals;

calculating various sound intensity average values corresponding to the audio signals which are alternatively inputted within a preset number of cycles by the at least two main microphones to acquire a maximum value among the sound intensity average values and a first main microphone corresponding to the maximum value; and judging whether at least one maximum value which is greater than or equal to a preset sound intensity value is acquired before the preset number of cycles reaches a set value;

wherein the set value is a ratio of an input time of normal input audio data of a main microphone to a product corresponding to main microphones, and the product corresponding to main microphones is a product of a total number of the main microphones and the first preset time length.

6. The method according to claim 5, wherein after using the first main microphone as the audio input, the method further comprises:

monitoring and collecting an audio signal inputted through the first main microphone according to a preset time interval;

calculating an average strength value corresponding to an audio signal inputted through the first main microphone within a second preset time length;

when it is judged that the average strength value is greater than or equal to a preset sound intensity value, continuing to use the first main microphone for inputting an audio; and when it is judged that the average strength value is less than the preset sound intensity value, returning to perform monitoring audio input signal strength of at least two main microphones arranged on the terminal.

7. The method according to claim 4, wherein after using the first main microphone as the audio input, the method further comprises:

monitoring and collecting an audio signal inputted through the first main microphone according to a preset time interval;

calculating an average strength value corresponding to an audio signal inputted through the first main microphone within a second preset time length;

when it is judged that the average strength value is greater than or equal to a preset sound intensity value, continuing to use the first main microphone for inputting an audio; and when it is judged that the average strength value is less than the preset sound intensity value, returning to perform monitoring audio input signal strength of at least two main microphones arranged on the terminal.

8. A non-transitory carrier carrying a computer program, the computer program comprising program instructions which, when executed by a terminal, cause the terminal to perform the method according to claim 1.

9. An apparatus for selecting a main microphone, comprising:

a monitoring module configured to monitor a working state parameter of the main microphone arranged on a terminal; and a processing module configured to judge whether the working state parameter satisfies a preset rule; and prompt a user that an audio input signal is abnormal or select a main microphone satisfying the preset rule as an audio input according to a judgment result;

wherein the working state parameter comprises audio input signal strength; and the processing module is configured to judge whether the audio input signal strength is less than a preset sound intensity value.

10. The apparatus according to claim 9, wherein the audio input signal strength is an average value of audio input signal strength within a preset time length.

11. The apparatus according to claim 9, wherein the monitoring module is configured to:

preset a first main microphone in at least two main microphones arranged on the terminal as the audio input, and monitor audio input signal strength of the first main microphone;

the processing module is configured to:

judge whether the audio input signal strength of the first main microphone is less than a preset sound intensity value; and if the audio input signal strength of the first main microphone is less than the preset sound intensity value, prompt the user that the audio input signal is abnormal; and if the audio input signal strength of the first main microphone is greater than or equal to the preset sound intensity value, use the preset main microphone as an audio input.

12. The apparatus according to claim 9, wherein the monitoring module is configured to:

monitor audio input signal strength of at least two main microphones arranged on the terminal;

the processing module is configured to:

calculate the audio input signal strength of the at least two main microphones to acquire a first main microphone with the maximum audio input signal strength; and judge whether audio input signal strength of the first main microphone is less than a preset sound intensity value; and if the audio input signal strength of the first main microphone is less than the preset sound intensity value, prompt the user that the audio input signal is abnormal; and if the audio input signal strength of the first main microphone is greater than or equal to the preset sound intensity value, use the first main microphone as an audio input.

13. The apparatus according to claim 12, wherein the processing module is configured to:

control at least two main microphones to alternately input an audio signal for a first preset time length and receive the audio signals;

calculate various sound intensity average values corresponding to the audio signals which are alternatively inputted within a preset number of cycles by the at least two main microphones to acquire a maximum value among the sound intensity average values and a first main microphone corresponding to the maximum value; and judge whether at least one maximum value which is greater than or equal to a preset sound intensity value is acquired before the preset number of cycles reaches a set value;

wherein the set value is a ratio of an input time of normal input audio data of a main microphone to a product corresponding to main microphones; the product corresponding to main microphones is a product of a total number of the main microphones and the first preset time length.

14. The apparatus according to claim 13, wherein the monitoring module is configured to:

monitor and collect an audio signal inputted through the first main microphone according to a preset time interval;

the processing module is configured to:

calculate an average strength value corresponding to an audio signal inputted through the first main microphone within a second preset time length;

when it is judged that the average strength value is greater than or equal to a preset sound intensity value, continue to use the first main microphone for inputting an audio; and when it is judged that the average strength value is less than the preset sound intensity value, return to perform, by the monitoring module, monitoring audio input signal strength of at least two main microphones arranged on the terminal.

15. The apparatus according to claim 12, wherein the monitoring module is configured to:

monitor and collect an audio signal inputted through the first main microphone according to a preset time interval;

the processing module is configured to:

calculate an average strength value corresponding to an audio signal inputted through the first main microphone within a second preset time length;

when it is judged that the average strength value is greater than or equal to a preset sound intensity value, continue to use the first main microphone for inputting an audio; and when it is judged that the average strength value is less than the preset sound intensity value, return to perform, by the monitoring module, monitoring audio input signal strength of at least two main microphones arranged on the terminal.

* * * * *